Sept. 27, 1927.
J. F. ELLIS
1,643,881
SNAP HOOK
Filed Oct. 15, 1924
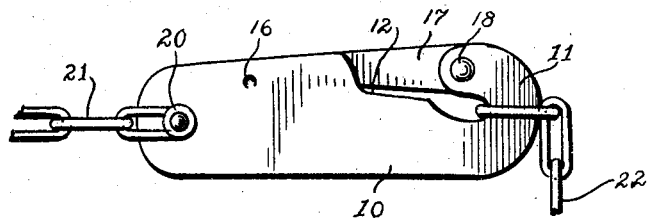
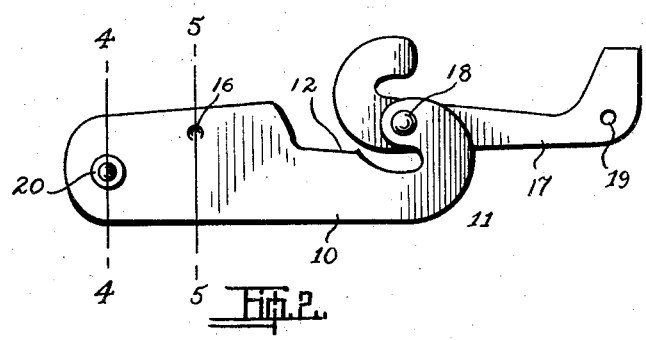
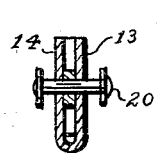 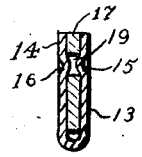 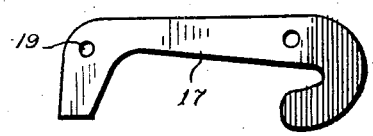
INVENTOR
James F. Ellis
BY *Feckerston Laughly Coy*
ATTORNEYS Patented Sept. 27, 1927.

1,643,881

UNITED STATES PATENT OFFICE.

JAMES FREDRICK ELLIS, OF LEWISTON, IDAHO.

SNAP HOOK.

Application filed October 15, 1924. Serial No. 743,787.

This invention relates to improvements in snap hooks, and the objects of the invention are to provide a hook of this character of simple and inexpensive structure particularly adapted for holding automobile chains, which can be quickly and readily applied and which, when in position, is automatically held securely there.

The invention consists essentially in the device, an embodiment of which is described in the present specification and illustrated by the accompanying drawings that form part of the same.

Referring to the drawings, in which like characters of reference indicate corresponding parts in each figure, Figure 1 is a side elevation of the snap hook in closed position.

Figure 2 is a similar view of the snap open.

Figure 3 is a plan view.

Figure 4 is a section on the line 4—4 of Figure 2.

Figure 5 is a section on the line 5—5 of Figure 2.

Figure 6 is a perspective detail of the hook member.

In the drawings:

10 indicates a casing substantially hook-shaped at one end at 11, and formed with a recess 12 in the top adjacent thereto. The casing 10 is open at the top and closed at the bottom, and consists essentially of a single piece of metal bent on itself to form the sides or casing portion 13 and 14 spaced from one another and formed adjacent the top with inwardly extending bulges 15 and 16 registering with one another.

A locking member 17 is pivotally mounted at 18 on the hook-shaped end of the casing, and is bent at its opposite end to extend downwardly into the casing, and provided at the top of the bent portion with an orifice 19 extending therethrough and adapted to register with and engage with the bulges 15 and 16 to lock it in position within the casing as shown in Figure 1.

20 indicates a bolt or rivet to which the opposite ends of the automobile chain or the like may be fastened. The snap, or as it may be appropriately called an automobile chain hook, is particularly adapted for use in holding automobile chains.

In operation, the locking member is first swung open as illustrated in Figure 2, and then swung to position as shown in Figure 1 with the bent head or point pressed downwardly between the sides of the casing, and engaging through the orifice therein with the bulges 15 and 16 formed in the casing, these bulges being formed by pressure from the outside. The automobile chains or otherwise are shown in Figure 1, and indicated by the numerals 21 and 22.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A new article of manufacture comprising a metallic section bent on itself to form parallel spaced sides and a closed base, the top being cut away and hook shaped at one end, a locking member hook shaped at one end and bent approximately at right angles at the other end pivotally mounted in the hooked end of the metallic section, bulges formed in said sides and means in the bend of the locking member adapted to engage with said bulges whereby the locking member in closed position is securely held between the sides.

In witness whereof I have hereunto set my hand.

JAMES F. ELLIS.